US 11,144,909 B1

(12) United States Patent
Mullen et al.

(10) Patent No.: US 11,144,909 B1
(45) Date of Patent: *Oct. 12, 2021

(54) CARDS DEPLOYED WITH INACTIVATED PRODUCTS FOR ACTIVATION

(71) Applicant: Dynamics Inc., Cheswick, PA (US)

(72) Inventors: Jeffrey D. Mullen, Pittsburgh, PA (US); Philip W. Yen, The Sail (SG); Christopher J. Rigatti, Pittsburgh, PA (US)

(73) Assignee: DYNAMICS INC., Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/713,390

(22) Filed: May 15, 2015

Related U.S. Application Data

(63) Continuation of application No. 14/273,969, filed on May 9, 2014, now Pat. No. 9,064,255, which is a continuation of application No. 13/762,644, filed on Feb. 8, 2013, now Pat. No. 8,757,483, which is a continuation of application No. 12/820,376, filed on Jun. 22, 2010, now Pat. No. 8,393,545.

(60) Provisional application No. 61/219,732, filed on Jun. 23, 2009.

(51) Int. Cl.
G06Q 20/34 (2012.01)
(52) U.S. Cl.
CPC ................... G06Q 20/354 (2013.01)
(58) Field of Classification Search
CPC ...................................................... G06Q 20/354
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

English translation of JP 05210770 A.

(Continued)

*Primary Examiner* — Christle I Marshall

(57) ABSTRACT

A payment card is provided with a display. A card may be provided to a user with a number of inactivated products. The products may be assigned to the user at card issuance. A user may then activate these products online or via phone. Accordingly, a user may be provided with a cross-selling platform for new products. Discounts, fee waivers, and/or value may be added to an account when an inactivated product is activated.

18 Claims, 8 Drawing Sheets

(56) References Cited

U.S. PATENT DOCUMENTS

| | | |
|---|---|---|
| 5,276,311 A | 1/1994 | Hennige |
| 5,347,580 A | 9/1994 | Molva et al. |
| 5,350,907 A * | 9/1994 | Sjoblom ............ G06Q 20/341 |
| | | 235/380 |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,884,271 A | 3/1999 | Pitroda |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,654,600 B1 | 11/2003 | Pollak |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,318,049 B2 | 1/2008 | Iannacci |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,389,269 B1 * | 6/2008 | Robinson ............... G07C 9/257 |
| | | 705/50 |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,606,771 B2 | 10/2009 | Keresman, III et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,704 B1 * | 6/2011 | Gephart ............ G06Q 20/3572 |
| | | 235/380 |
| 7,954,705 B2 | 6/2011 | Mullen |
| 8,011,577 B2 | 9/2011 | Mullen et al. |
| 8,020,775 B2 | 9/2011 | Mullen et al. |
| 8,074,877 B2 | 12/2011 | Mullen et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,382,000 B2 | 2/2013 | Mullen et al. |
| 8,393,545 B1 * | 3/2013 | Mullen ................ G06Q 20/341 |
| | | 235/487 |
| 8,413,892 B2 | 4/2013 | Mullen et al. |

(56) References Cited

U.S. PATENT DOCUMENTS

| | | | |
|---|---|---|---|
| 8,424,773 B2 | 4/2013 | Mullen et al. | |
| 8,459,548 B2 | 6/2013 | Mullen et al. | |
| 8,485,437 B2 | 7/2013 | Mullen et al. | |
| 8,517,276 B2 | 8/2013 | Mullen et al. | |
| 8,579,203 B1 | 11/2013 | Lambeth et al. | |
| 8,608,083 B2 | 12/2013 | Mullen et al. | |
| 8,622,309 B1 | 1/2014 | Mullen et al. | |
| 8,668,143 B2 | 3/2014 | Mullen et al. | |
| 8,732,045 B2* | 5/2014 | Walker | G06Q 10/02 705/35 |
| 8,733,638 B2 | 5/2014 | Mullen et al. | |
| 8,757,483 B1* | 6/2014 | Mullen | G06Q 20/341 235/375 |
| 8,757,499 B2 | 6/2014 | Cloutier et al. | |
| 8,875,999 B2 | 11/2014 | Mullen et al. | |
| 8,881,989 B2 | 11/2014 | Mullen et al. | |
| 8,931,703 B1 | 1/2015 | Mullen et al. | |
| 8,973,824 B2 | 3/2015 | Mullen et al. | |
| 9,004,368 B2 | 4/2015 | Mullen et al. | |
| 9,010,630 B2 | 4/2015 | Mullen et al. | |
| 9,361,569 B2 | 6/2016 | Mullen et al. | |
| 9,384,438 B2 | 7/2016 | Mullen et al. | |
| 9,390,440 B2* | 7/2016 | Bull | G06Q 30/0601 |
| 9,547,816 B2 | 1/2017 | Mullen et al. | |
| 9,639,796 B2 | 5/2017 | Mullen et al. | |
| 9,684,861 B2 | 6/2017 | Mullen et al. | |
| 9,697,454 B2 | 7/2017 | Mullen et al. | |
| 9,704,088 B2 | 7/2017 | Mullen et al. | |
| 9,704,089 B2 | 7/2017 | Mullen et al. | |
| 9,727,813 B2 | 8/2017 | Mullen et al. | |
| 9,805,297 B2 | 10/2017 | Mullen et al. | |
| 10,032,100 B2 | 7/2018 | Mullen et al. | |
| 10,095,974 B1 | 10/2018 | Mullen et al. | |
| 10,169,692 B2 | 1/2019 | Mullen et al. | |
| 10,198,687 B2 | 2/2019 | Mullen et al. | |
| 10,223,631 B2 | 3/2019 | Mullen et al. | |
| 10,255,545 B2 | 4/2019 | Mullen et al. | |
| 10,325,199 B2 | 6/2019 | Mullen et al. | |
| 10,430,704 B2 | 10/2019 | Mullen et al. | |
| 10,467,521 B2 | 11/2019 | Mullen et al. | |
| 10,475,025 B2* | 11/2019 | Zarakas | G06Q 20/3563 |
| 10,496,918 B2 | 12/2019 | Mullen et al. | |
| 10,579,920 B2 | 3/2020 | Mullen et al. | |
| 10,997,489 B2 | 5/2021 | Mullen et al. | |
| 11,062,195 B2 | 7/2021 | Mullen | |
| 2001/0034702 A1 | 10/2001 | Mockett et al. | |
| 2001/0042784 A1* | 11/2001 | Fite | G06Q 20/202 235/379 |
| 2001/0047335 A1 | 11/2001 | Arndt et al. | |
| 2002/0019781 A1* | 2/2002 | Shooks | G06Q 20/00 705/26.42 |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2002/0139844 A1* | 10/2002 | Rochman | G06Q 20/32 235/380 |
| 2003/0028481 A1* | 2/2003 | Flitcroft | G07F 19/00 705/39 |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0065624 A1* | 4/2003 | James | G06Q 20/3829 705/64 |
| 2003/0116635 A1 | 6/2003 | Taban | |
| 2003/0152253 A1 | 8/2003 | Wong | |
| 2003/0163287 A1 | 8/2003 | Vock et al. | |
| 2003/0168510 A1* | 9/2003 | Allen | G06Q 20/28 235/380 |
| 2003/0173409 A1 | 9/2003 | Wong et al. | |
| 2003/0179909 A1 | 9/2003 | Wong | |
| 2003/0179910 A1 | 9/2003 | Wong | |
| 2003/0200179 A1 | 10/2003 | Kwan | |
| 2003/0226899 A1 | 12/2003 | Finkelstein | |
| 2004/0035942 A1 | 2/2004 | Silverman | |
| 2004/0117300 A1* | 6/2004 | Jones | G07F 7/025 705/39 |
| 2004/0133787 A1 | 7/2004 | Doughty | |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2005/0004866 A1* | 1/2005 | Bonalle | G06Q 20/14 705/39 |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0154643 A1 | 7/2005 | Doan et al. | |
| 2005/0228959 A1 | 10/2005 | D'Albore et al. | |
| 2006/0000900 A1 | 1/2006 | Fernandes et al. | |
| 2006/0032908 A1* | 2/2006 | Sines | G06K 19/06187 235/380 |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2007/0034700 A1 | 2/2007 | Poidomani et al. | |
| 2007/0045406 A1* | 3/2007 | Giesen | G06Q 20/24 235/380 |
| 2007/0073619 A1* | 3/2007 | Smith | G06Q 20/105 705/41 |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0179865 A1* | 8/2007 | Hibler | G06Q 20/00 705/26.35 |
| 2007/0185782 A1* | 8/2007 | Shooks | G06Q 20/00 705/26.35 |
| 2007/0192249 A1 | 8/2007 | Biffle et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0282723 A1* | 12/2007 | Cohen | G06Q 40/02 705/35 |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0029607 A1 | 2/2008 | Mullen | |
| 2008/0035738 A1 | 2/2008 | Mullen | |
| 2008/0040271 A1 | 2/2008 | Hammad et al. | |
| 2008/0040276 A1 | 2/2008 | Hammad et al. | |
| 2008/0052225 A1* | 2/2008 | Walker | G06Q 10/02 705/38 |
| 2008/0054068 A1 | 3/2008 | Mullen | |
| 2008/0054079 A1 | 3/2008 | Mullen | |
| 2008/0054081 A1 | 3/2008 | Mullen | |
| 2008/0058016 A1 | 3/2008 | Di Maggio et al. | |
| 2008/0059379 A1 | 3/2008 | Ramaci et al. | |
| 2008/0065555 A1 | 3/2008 | Mullen | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0242267 A1* | 10/2008 | Soni | H04M 15/715 455/411 |

(56) References Cited

U.S. PATENT DOCUMENTS

| | | |
|---|---|---|
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0063343 A1* | 3/2009 | Mertz .................. G06Q 20/363 705/41 |
| 2009/0070260 A1* | 3/2009 | Flitcroft ................. G06Q 20/00 705/41 |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0224060 A1 | 9/2009 | Hatamian |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0265270 A1* | 10/2009 | Gangaraju ............ G06Q 20/105 705/41 |
| 2009/0290704 A1 | 11/2009 | Cimino |
| 2009/0303885 A1 | 12/2009 | Longo |
| 2009/0308921 A1 | 12/2009 | Mullen |
| 2009/0309701 A1* | 12/2009 | Peled .................... G06Q 20/341 340/5.83 |
| 2010/0082481 A1 | 4/2010 | Lin et al. |
| 2010/0294835 A1* | 11/2010 | Bam ...................... G06Q 20/28 235/382 |
| 2011/0028184 A1 | 2/2011 | Cooper |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2012/0286037 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |
| 2015/0186766 A1 | 7/2015 | Mullen et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |

FOREIGN PATENT DOCUMENTS

| | | |
|---|---|---|
| WO | WO0247019 | 6/2002 |
| WO | WO06066322 | 6/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/594,300, Poidomani et al.
U.S. Appl. No. 60/675,388, Poidomani et al.
The Bank Credit Card Business. Second Edition, American Bankers Association, Washington, D.C., 1996. All pages.
A Day in the Life of a Flux Reversal.http://www.phrack.org/issues.html?issue=37&id=6#article Nov. 22, 1992.
Dynamic Virtual Credit Card Numbers. http://homes.cerias.purdue.edu/~jtli/paper/fc07.pdf, Sep. 6, 2007.
English translation of JP 05210770 A, 1993.

* cited by examiner

CARDS DEPLOYED WITH INACTIVATED PRODUCTS FOR ACTIVATION

CROSS-REFERENCE TO RELATED APPLICATIONS

This application is a continuation of U.S. patent application Ser. No. 14/273,969, filed on May 9, 2014, titled "CARDS DEPLOYED WITH INACTIVATED PRODUCTS FOR ACTIVATION", which is a continuation of U.S. patent application Ser. No. 13/762,644, filed on Feb. 8, 2013, titled "CARDS DEPLOYED WITH INACTIVATED PRODUCTS FOR ACTIVATION", which is a continuation of U.S. patent application Ser. No. 12/820,376, filed on Jun. 22, 2010, titled "CARDS DEPLOYED WITH INACTIVATED PRODUCTS FOR ACTIVATION", which claims the benefit of U.S. Provisional Patent Application No. 61/219,732, filed Jun. 23, 2009, titled "CARDS DEPLOYED WITH INACTIVATED PRODUCTS FOR ACTIVATION", each of which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may be provided to a user with products that the user did not request. For example, a card may be provided to a user with products the user did not request at the time the user requested (e.g., applied for) the card (e.g., a credit card). Accordingly, the user may activate a product on a card. Such products may include, for example, additional payment cards (e.g., credit, debit cards, and gift cards) by including associated payment data (e.g., payment card account numbers, expiration dates, and associated additional data). Additional payment products may include products of the same financial type (e.g., credit), but from different payment network brand associations (e.g., Discover, American Express, Visa, and MasterCard). Similarly, additional payment products may include products of the different financial types (e.g., credit, debit, and pre-paid) but from different associations (e.g., Discover, American Express, Visa, and MasterCard). Multiple products may be on a card of the same or different financial types from the same association.

Incentives may be associated with new products upon activation. The ability to activate a new product may be limited in time. For example, a timer on a card may keep track of a time from when a user first uses a card. A remote server may keep track of time from when the card was mailed to a user or if a user activates an originally requested product online or via the phone. Activating a product (e.g., such as a product a user did not originally request) may be performed, for example, on-card (e.g., via buttons). Information representative of the activation may then be communicated through a dynamic magnetic communications device to a magnetic stripe reader in, for example, a discretionary data field located on the card. Such information may also be communicated, for example, via an RFID, exposed IC chip (e.g., an EMV chip), or via any other method (e.g., a code is displayed on a display of a card and a user enters this code in via a website). A user may, for example, activate a product on a card by visiting the website of an issuing bank or calling the issuing bank over the phone.

An activation may be performed such that transaction authorization servers accept payments from a particular product after activation. A card user may be provided with (e.g., over the phone or online) a code to enter into a card in order to unlock the product on the card. For example, a product unlock code may be required for a processor to send payment information associated with the product through a dynamic magnetic communications device or other communications device (e.g., RFID or exposed IC chip). Similarly, the card may provide an unlocking code for a user to enter online or verbally communicate over the phone to positively identify that a user is in possession of a card. A product unlocking code may be communicated in response to an identification code. A product unlocking code may be manually entered into a card or wirelessly provided to a card (e.g., via sound, light, or electromagnetic signal). For example, a card may include a light sensor capable of receiving light-based information signals. A user may hold his/her card up to a display showing a website and a graphical user interface on the website may communicate a product unlock code to a card via light (e.g., via blinking information to a card).

Codes may be used to communicate new products to a card. Accordingly, a user may be able to add new products to a card. For example, a user may add a gift product, a credit product, a debit product, a pre-paid product, or any product to a card. Adding a product may include, for example, adding a payment account number associated with the product as well as any additional data (e.g., expiration date, security codes, and discretionary data). Information communicated to a card for adding a new product may include information a card may display via a display for that product as well as information a card may communicate to a card reader for that product (e.g., magnetic stripe, RFID, or exposed IC chip information). Any information communicated to a card may be done manually (e.g., via manual user interfaces on the card) or autonomously (e.g., via light, sound, or electromagnetic communications).

Similar to a new product being added to a card, a new product may replace an old product on a card. For example, a user may desire to replace an old product (e.g., a Visa branded credit card) with a new product (e.g., an American Express branded credit card). The user may manually enter a code into the card to perform such a replacement or a code may be communicated wirelessly to a card (e.g., via light pulses, sound pulses, or other wireless communication signals). The code may be displayed on a website (e.g., from a card issuer that issues the card) so that a user may manually enter the code into a manual interface on the card. The code may be communicated wirelessly to a card from a website (e.g., via light and/or sound).

A new product may be utilized to replace an expired product. For example, a particular credit product may expire at a particular date. Accordingly, a user may add a new product to the card before or after the product expires. This new product may have a different expiration date that occurs, for example, after the expiration date of the original product. The new product may have a different account number and associated data. The card may utilize a display to display all, or a portion of, the payment account number. A dynamic magnetic stripe communications device may communicate the payment account number as well as any associated data (e.g., associated discretionary magnetic stripe data).

Information associated with a payment product may be changed via codes. For example, a verification code may be changed on the card via a code such that, for example, a card's expiration date may be extended. In this manner, a code may include information representative of a new verification code as well as the change in expiration date. The code may also include information indicative of what product stored on the card the information is to update. The code may include, for example, what information (e.g., characters) should be replaced with characters included in the code. A card may include multiple verification codes. For example, a card may include a verification code for authorizing on-line purchases and a card may include a verification code for authorizing magnetic stripe purchases. A code extending the expiration of a card may, for example, change both of these verification codes. The changed verification code for on-line use may be displayed via a display while the changed verification code for use with a magnetic stripe reader may be communicated through a dynamic magnetic stripe communications device. Codes may be communicated to a card manually (via user input), via a wire-based communication (e.g., via an electrical communication such as USB), or wirelessly (e.g., via an electromagnetic signal, light-based signal, or sound-based signal).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
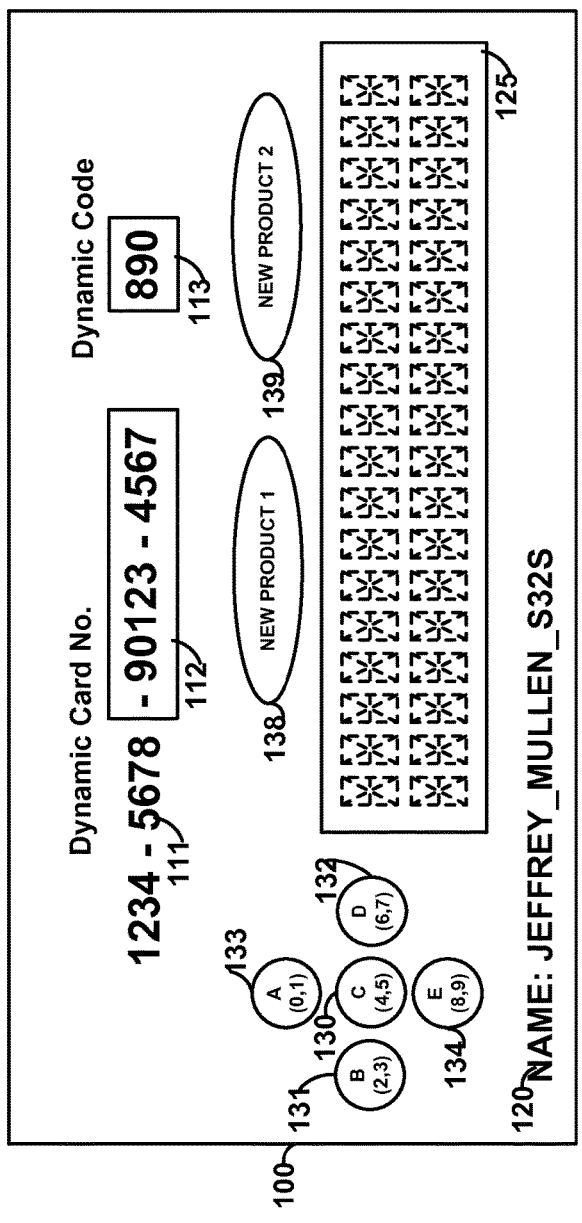
FIG. 1 is an illustration of cards constructed in accordance with the principles of the present invention.
Figure 1:
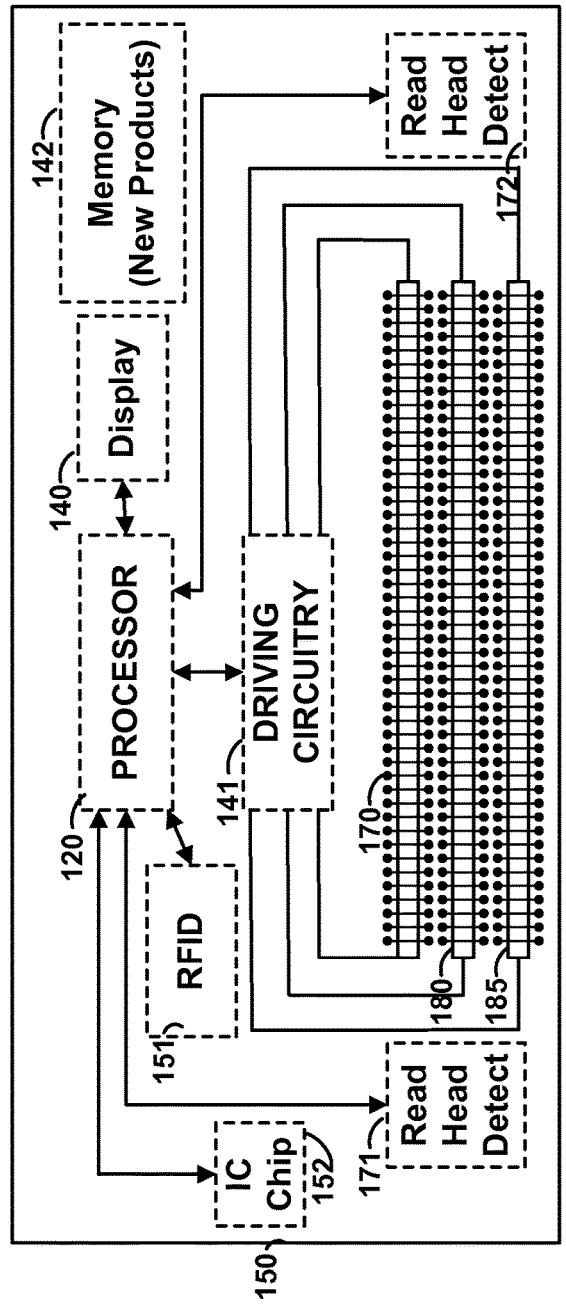

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons.

Buttons 138 and 139 may be included and may be associated with additional products. For example, card 100 may be shipped to a user with a single product (e.g., a single credit product). Card 100, however, may have additional products stored on the card in case the user of card 100 determines those products to be useful in light of the user's preferences.

A product activation code may be utilized to activate a product. The product may be stored on the card or other device (e.g., a mobile telephonic device) and may be inactive to authorize a purchase until activated. This product activation code may be entered online via a website or on the card. The code may be entered on the card manually (e.g., via a user interface) or via a wire-based or wireless connection (e.g., a wireless connection to a computer). Accordingly, the product may be activated on the card (or other device) or on a remote authorization server.

Product activation may occur in a variety of ways. Particularly, for example, an activation code received on a card may cause a processor to communicate product data via a communications device when a button associated with that product is pressed. For example, a payment card number associated with a product may be communicated through an RFID antenna, IC chip, and/or magnetic stripe communications device once the product is activated on card 100. Additionally, for example, data associated with the product (e.g., a portion or the entire payment card number) may be displayed on a display on card 100 after a product has been activated. Product data may, for example, be pre-stored on a card when the card is mailed to a user. An activation code may cause a particular product to be associated with a particular button (or manual interface input) and communicated through a communications device (e.g., a dynamic magnetic stripe communications device) when that button (or manual interface input) is provided by a user to a card. An activation code may be received online, in a store, or over a phone to enter into a card.

A pre-stored product may be pre-associated to a particular button or may be associated to a particular button at activation. For example, a primary product (e.g., a product the user desired to obtain and was mailed to a user) may have printed information on the face of a card for online and phone purchases. A non-activated product may also have printed information on the face of a card for online and phone purchases and may be associated with a button for in-store purchases, but may not communicate magnetic stripe information until the product is activated. Similarly, for example, the product may have a verification code that displays on a display after product activation. Alternatively, for example, the activation code may be printed. As per another example, a card may have a plurality of buttons (e.g., two), but may have more non-activated products stored than buttons. In doing so, an issuer may be provided with a number of cross-selling opportunities. When a user activates a particular product, that product may be associated with a button. As such, the corresponding magnetic stripe data communicated through a dynamic magnetic stripe communications device may be communicated when the associated button is pressed by a user. In doing so, more products may be stored in a card in an inactivated state than there are buttons, or other manual user interface inputs, on a card. In this manner, a user may be provided with a larger variety of products to activate. An activated product may be associated with the next available button from a list of available buttons. Displays next to these buttons may be utilized to, for example, indicate the payment product associated to the button. A card may have a particular button for activating a product that may be pressed before an activation code is entered. In doing so, the processor of a card may determine when a code is desired to be entered by a user.

A product may be activated on a remote authorization server. Accordingly, a card may, for example, communicate data (e.g., via a magnetic stripe communications device) before a payment product is activated. Yet, the authorization of a payment associated with that payment product may not be authorized until the product is activated. Accordingly, activation of the authorization may occur by having a user enter a code online or provide a code over the phone. This code may be generated by a card via a display to identify the card and/or payment product. In this manner, for example, a card may be provided to a user in a particular configuration. For example, the card may include multiple printed account numbers for both activated and non-activated products. A button may be associated with each activated and non-activated product. To activate a product, a user may activate a product online or via a telephone call. The user may identify himself/herself in a variety of ways such as, for example, answering a number of security questions, providing information about recent purchases, and/or providing particular passwords. A card-generated and displayed activation code may also be utilized. The product may be activated such that the product may be utilized to authorize purchase transactions. Accordingly, the product may be used online or offline before activation but not cause a purchase transaction to complete until the product is activated and remote authorization servers updated with product activation information.

Both a card and the authorization servers may, for example, be activated. For example, a user may press button 138 to receive an authorization activation code. A user may provide this information to a remote server (e.g., either online or via an operator over the phone). The user may receive an on-card product activation code from this remote server (e.g., via a webpage or via the operator over the phone). The card may then receive this code to activate the product for the button and, for example, cause the next press of button 138 to display information associated with that product on display 125 (e.g., a payment card number) and communicate information associated with the product via one or more communication devices (e.g., RFID antennas, IC chips, or magnetic stripe communication devices). The code may be received via manual input (e.g., manual input using buttons 130-134), wire-based input (e.g., USB) or wireless input (e.g., via light pulses, sound pulses, or other wireless communication signals).

A product that a user did not particularly request to be on a card may or may not require an activation code to initiate the product. The additional product may be utilized by a user by, for example, entering manual input into the card indicative of a desire to use that additional product (e.g., pushing a mechanical button). Accordingly, a user may receive a mailing that includes a card with a payment product that a user requested as well as one or more products that the user did not request. Such products may be pre-approved and may operate and authorize transactions without, for example, a particular activation code. A card may include additional products that a user did not request, for example, where some of these additional products require an activation code and other of these additional products do not require an activation code.

Activation of inactivated products can be performed online via a webpage or over the phone via an operator without the actual use of an activation code. For example, a user may identify himself/herself by logging into an online account. The user may select a primary account associated with a card. The user may then be displayed with information associated with the additional products that were provided on the card. Accordingly, a user may select an activation button on the website to activate the product. A card may generate (e.g., display) a code after a product is activated that may be provided back to a remote facility to confirm proper activation. Additionally, a card may generate a code via a communications device (e.g., a dynamic magnetic stripe device, RFID, or IC chip) such that an on-card activation verification code may be communicated with a user's first purchase.

Products that may be placed on a card may include, for example, debit products (e.g., decoupled or coupled debit products), credit products, gift products, pre-paid payment products, loyalty products, or any other type of product. Such products may each have a different number that is communicated via one or more reader communications devices (e.g., an RFID antenna, IC chip, or magnetic stripe communications device) as well as one or more displays.

Accordingly, for example, a grocery store chain (e.g., Giant Eagle) may provide users with a credit card that includes an inactivated loyalty number. The loyalty number may be used to receive discounts and instant coupons at the grocery store chain. Accordingly, a user may press a button, for example, associated with the credit card product to have a credit card number associated with that credit card product communicated via a communications device (e.g., a magnetic stripe communications device). A user may press a different button, for example, associated with the loyalty product, to have the loyalty number associated with the loyalty product, communicated via a communications device (e.g., that same magnetic stripe communications device). Alternatively, for example, the credit card product may be a default product that automatically communicates the credit card number associated with the default credit card product whenever the card is utilized without additional manual input. A user may log into his/her online account for the credit card product and may activate the loyalty card. Additionally, for example, the user may change/replace the number by changing the number online via the website and being provided with a code to enter into the card to change/ replace the product (e.g., via manual input, light, sound, or a wireless or wire-based communications signal).

Incentives to activate a product may be provided to a user. Such incentives may be displayed online (e.g., via a webpage displaying the products to-be-activated) or on-card. For example, a user may press a button associated with an inactivated card and may be provided with an incentive on a display. For example, a user may be provided with text indicating that if the user activates the product within a period of time (e.g., within the next 10 days) then an amount of money may be added to a user's account. Accordingly, a card may provide an activation code that includes embedded information indicative of the incentive. An incentive code (e.g., promotional code) may also be displayed to a user. Incentives may be displayed based on time. For example, one incentive may be displayed during the first 10 days a card is used by a user and a different incentive may be displayed during the next 10 days a card is used by a user. After all incentives are exhausted, for example, a card may erase the new product so that the product is removed from a card. An incentive and/or new product may be erased after a period of time or upon a card receiving manual input from a user indicative of a user's desire to erase the product and/or incentive.

Similarly, for example, multiple new products may be stored on the card and rotated such that different new products may be displayed to a user. A display may be provided next to a button and the name of the new product may be displayed on such a display. A user may navigate through possible new products and may select, on card 100, the product or products the user desires. A user may erase products the user does not desire from a memory of card 100.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may include a user-specific and card-specific data (e.g., name, account number, inactivated product information, activation incentives for inactivated products).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
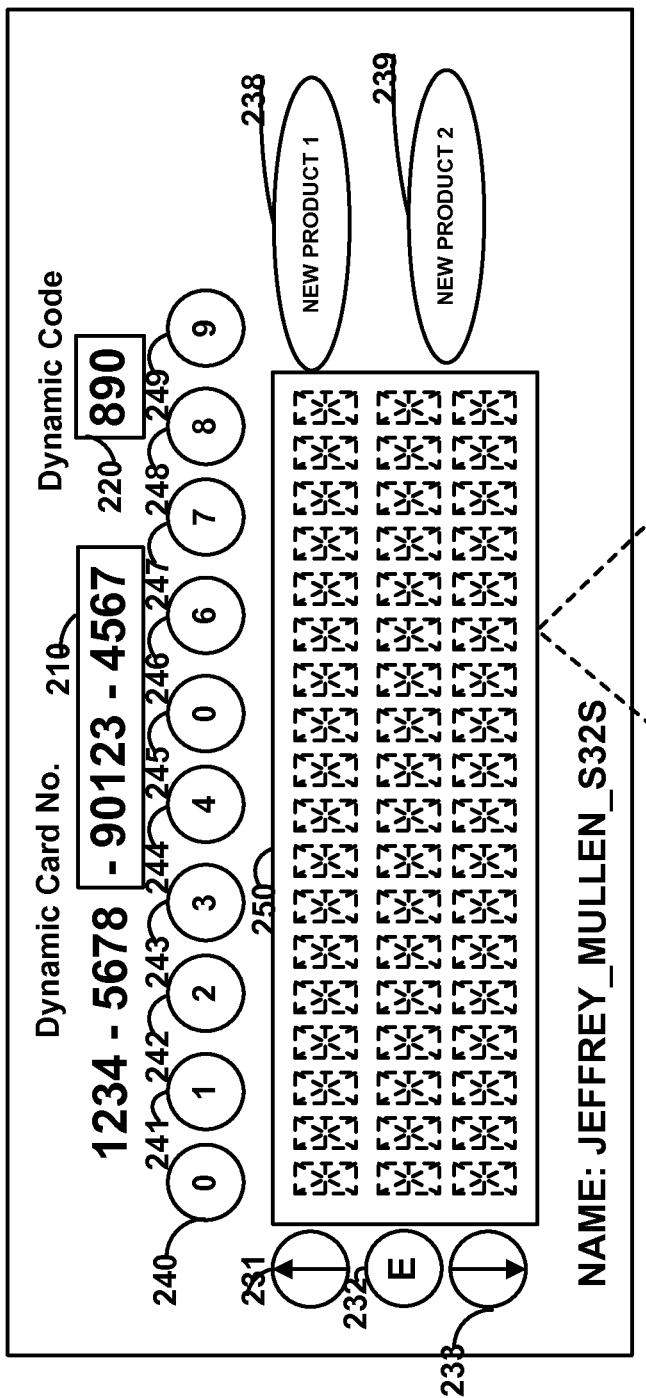
FIG. 2 is an illustration of a card constructed in accordance with the principles of the present invention.
Figure 2:
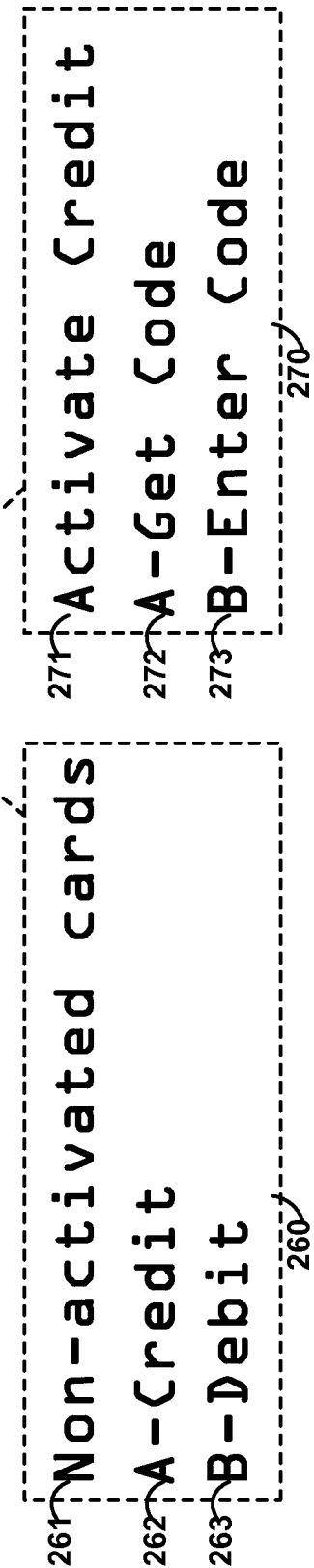

FIG. 2 shows card 200. Card 200 may include manual input interfaces 240-249. Each one of manual input interfaces 240-249 may include indicia indicative of the type of input associated to the particular manual input interface. For example, manual input interfaces 240-249 may each include indicia representative of a digit and/or letter. Manual input interfaces 231, 232, and 233 may also be included. Manual input interfaces 231 and 233 may be utilized to, for example, scroll through options on display 250 while 232 may be utilized to select a particular option.

Graphical User Interface (GUI) 260 may be displayed via a display (e.g., display 250 of card 200). Any number of lines, such as three lines of information, may be provided to a user. For example, line 261 may display information indicative of a type of user selection. Lines 262 and 263 may each include a single selection for a user or multiple selections for a user. A user may then utilize manual input interfaces 240-249 to select a particular option. Else, for example, a user may utilize manual input interfaces 231 and 233 to toggle between selections and manual input interface 232 to select a selection. Persons skilled in the art will appreciate that a selection may be graphically highlighted. For example, the color of the information may change, the font of the information may change, and/or the size of the information may change. Similarly, for example, the background of the information may change colors. A bi-stable display may, for example, inverse the background and displayed information such that a highlighted selection inverses the colors of the background and the information.

Information 270 may, for example, display information representative of receiving a correct unlocking code by a user. More particularly, for example, a card may operate in a low-power mode and not provide particular functionality until an appropriate unlocking code is entered in by a user. An unlocking code may take any form. For example, an unlocking code may take the form of a particular combination of manual input via manual input interfaces 240-249. For example, if each of manual input interfaces 240-249 includes indicia representative of a particular digit, an unlocking code for a user may take the form of "12345." The entrance of a proper unlocking code may cause a processor of card 200 to display GUI 260 on a display.

GUI 260 may be displayed on display 250. GUI 260 may, for example, provide user information 261 indicating that multiple inactivated cards are stored on the card, information 262 indicative of a non-activated credit product, and information 263 indicative of a non-activated debit product.

Persons skilled in the art will appreciate that a user may be provided with a card that does not include an activated product and a user may select a particular product or products for activation. GUI 270 may be displayed on display 250. GUI 270 may, for example, provide user information 271 indicative of instructions to activate a product, information 272 indicative of a feature to get a code for activation, and information 273 indicative of a feature to provide a code for activation.

Figure 3:
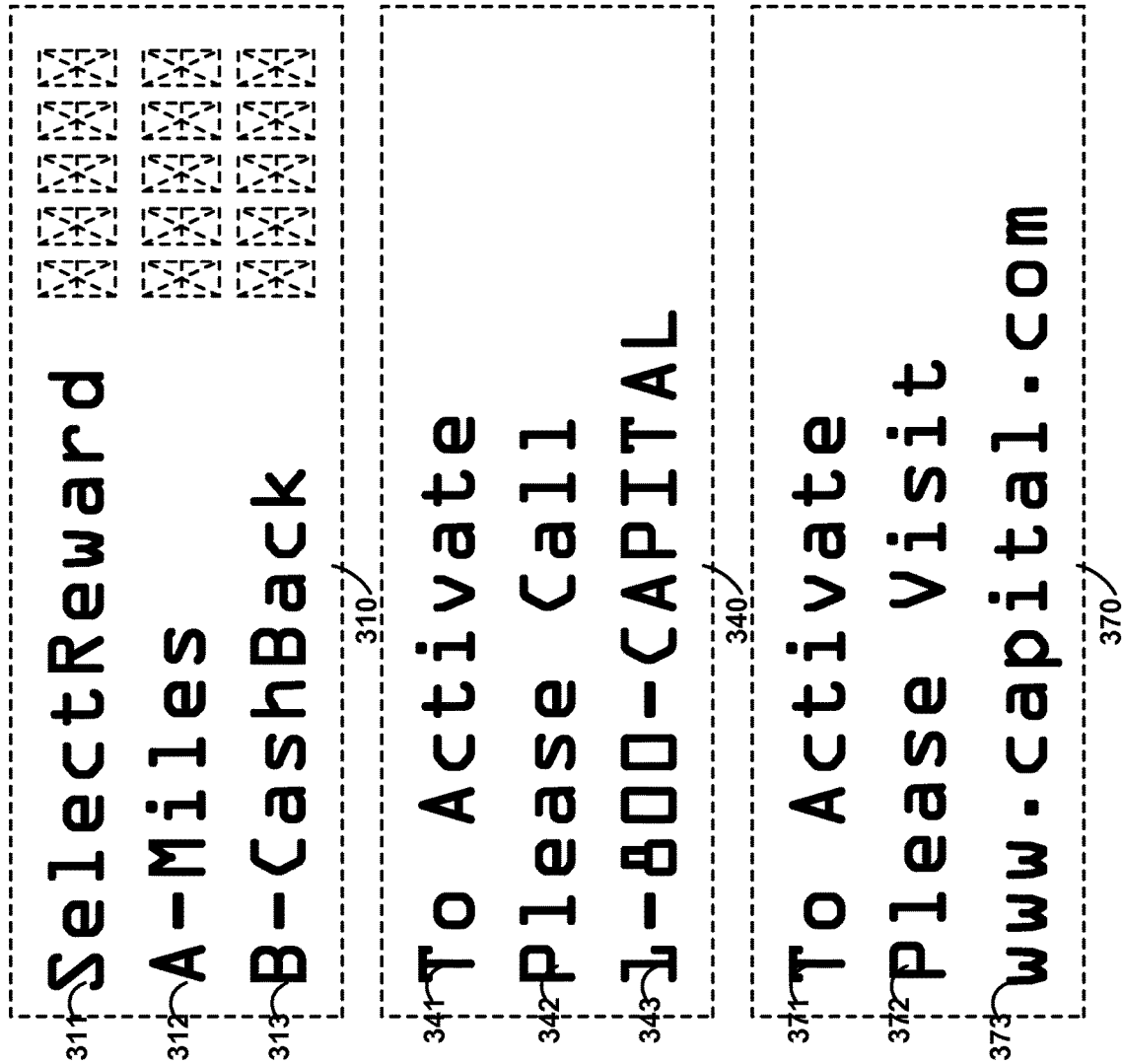
FIG. 3 is an illustration of display screens constructed in accordance with the principles of the present invention.

FIG. 3 shows GUIs 310, 340, and 370. GUI 310 includes information 311, which may be utilized, for example, to indicate to a user that a reward selection for a product is desired by a card. A user may utilize user interfaces associated with information 312 (e.g., button "A") and information 313 (e.g., button "B") to determine the type of reward that a user desires for a card. Accordingly, for example, characteristics of a product may be selected by a user before the product is activated. Persons skilled in the art will appreciate that characteristics of a product may also be changed by a user after a product is activated. GUI 310, or any GUI or physical card configuration, may be provided, for example, on a display of a card with physical buttons or a display of a mobile telephonic device displaying a virtual card with virtual buttons.

GUI 340 shows information 341 that may be indicative, for example, of an instruction on how to activate a product and/or card. Information 342 and 343 may be utilized, for example, to provide a telephone number and associated instructions to a user so that the user may activate a card and/or product.

GUI 370 shows information 371 that may be indicative, for example, of an instruction on how to activate a product and/or card. Information 372 and 373 may be utilized, for example, to provide a webpage and associated instructions to a user so that the user may activate a card and/or product.

Persons skilled in the art will appreciate that data associated with a product may include a card number (e.g., a fifteen or sixteen digit number) and associated discretionary data (e.g., expiration date, security code, and other additional data). Such data may be communicated via a magnetic stripe communications device to a magnetic stripe reader as a single or multiple (e.g., two or three) tracks of data. A display may be provided on a card to display such discretionary data. This discretionary data may be entered in online at the time of a purchase. For example, multiple security codes may be displayed. Each security code may be utilized to authenticate a transaction. However, each different security code may be associated to a different product. In this way, for example, product information may be communicated through transactions that are performed online or over the phone. Persons skilled in the art will appreciate that multiple security codes may be communicated (e.g., via a dynamic magnetic stripe communications device) to authorize a transaction in order to increase the security of the transaction.

Persons skilled in the art will appreciate that card numbers for inactivated products may be permanently represented on a surface of a card. For example, a payment card number associated with inactivated products may be printed, embossed, or laser engraved on the surface of a card. Similarly, information associated with these products may also be permanently represented on the surface of a card. For example, verification codes for use in validating online transactions may be printed, embossed, or laser engraved on the same, or a different surface, of a card as an associated payment card number. Additionally, for example, either all or a portion of a payment card number or other information (e.g., a security code) may be displayed on one or more displays on the same, or different, surfaces of a card.

Persons skilled in the art will also appreciate that a card may receive information from a card reader. For example, an electromagnetic generator may be formed from a coil. A reader that includes a magnetic stripe encoder may generate electromagnetic fields that may, for example, be received as communication signals by this coil. Accordingly, the card may receive information from a magnetic stripe reader. Additionally, an RFID may receive information from an RFID reader and an exposed IC chip (e.g., an EMV chip) may receive information from an IC chip reader. Information may also be received in a variety of other ways. For example, a light sensor may receive light pulses, indicative of information, from a display.

A source of light may be included to communicate information to another card. Similarly, for example, a magnetic stripe communications device on one card may communicate information to a magnetic stripe communications device on another card. Information sent to another card may include, for example, account information, product information, as well as other information. A light sensor may be utilized to receive information from a card or other device (e.g., a display of a laptop using a browser running code from a bank that issued the card).

Accordingly, for example, a card may communicate its configuration and personalization data to another card. In this manner, for example, a card holder may receive a new card at a particular date (e.g., near the end of the life expectancy of a card or after a card sends a signal through a payment communication to a reader indicative of low battery power or inability to operate properly). The card holder may enter a master synching code into the old card and a slave synching code into the new card. The old card may then communicate its personalization and other data to the new card. Accordingly, the new card may be configured to operate the same as the old card. The old card may then erase all of its personalization, and other, information such that the old card is blank. Accordingly, an old card may transfer its data to a new card. Similarly, a new card may include card updates that may be added to the data transferred from the old card. Furthermore, card updates (e.g., code improvements) may be communicated via manually entered data, wire-based communications, or wireless communications (e.g., via light pulses, sound pulses, or other wireless communication signals).

Figure 4:
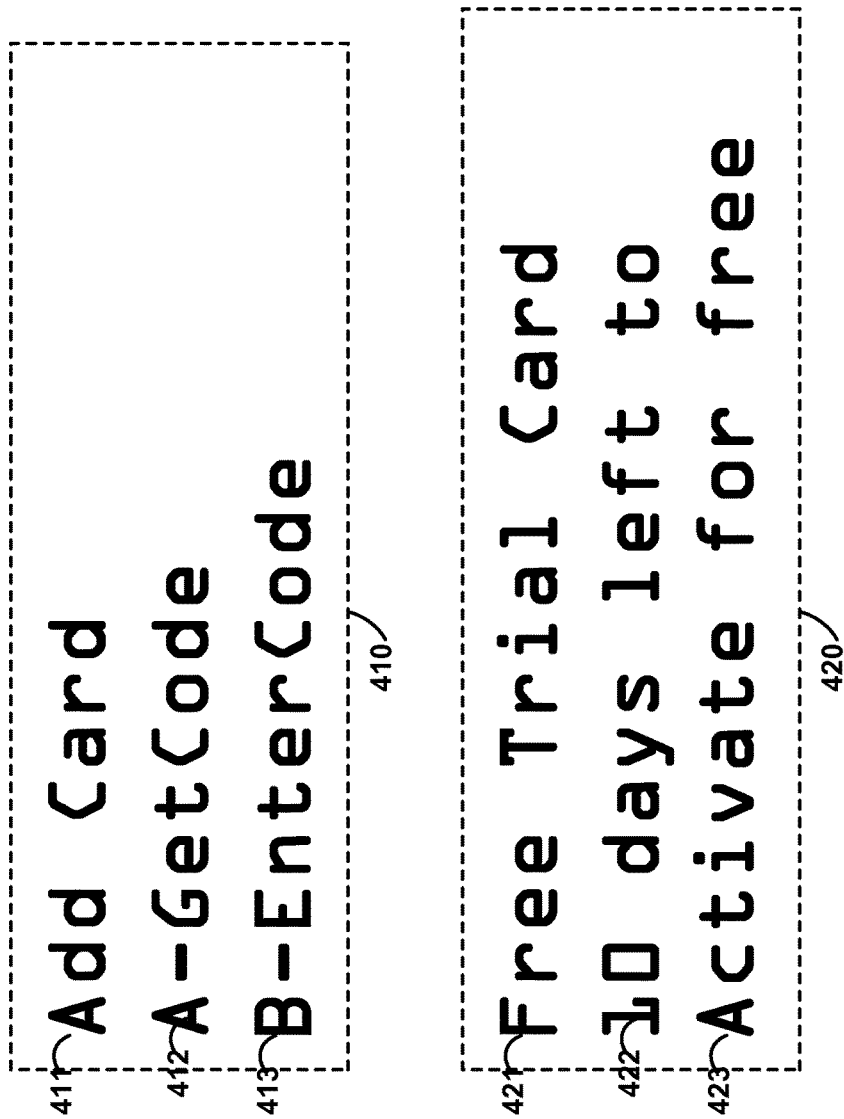
FIG. 4 is an illustration of display screens constructed in accordance with the principles of the present invention.

FIG. 4 shows GUI 410 and 420. GUI 410 may include, for example, information 411 indicative of a feature that may allow a user to add a product to the card. Information 412 may be used, for example, to get a code (e.g., in order to identify the card) and information 413 to receive a card (e.g., in order to receive a code generated particularly for the identified card). GUI 420 may include, for example, information 421 indicative of characteristics of a product. Information 422 and 423 may be utilized to display activation requirements and expiration.

Figure 5:
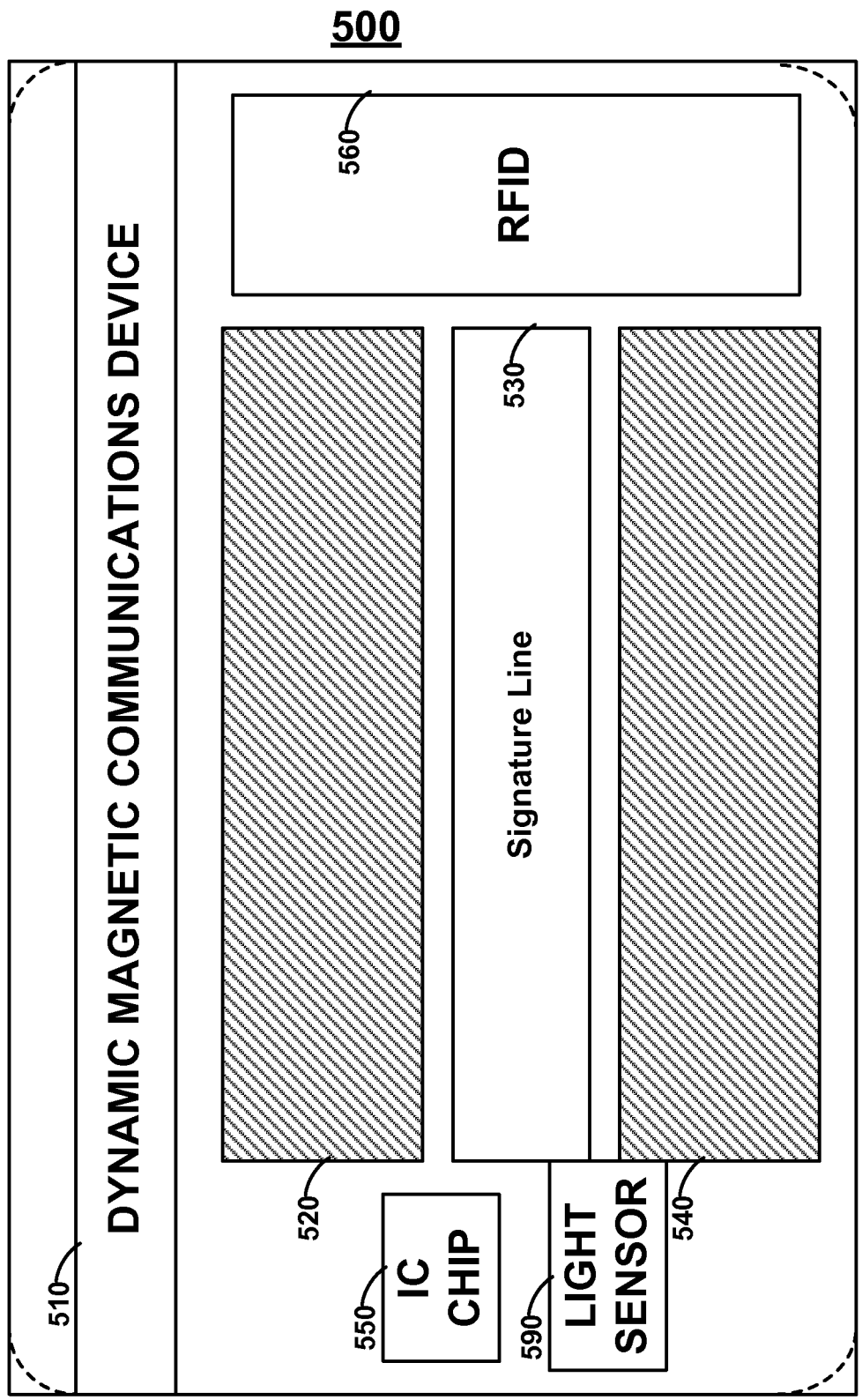
FIG. 5 is an illustration of a card constructed in accordance with the principles of the present invention.

FIG. 5 shows card 500 that may include, for example, dynamic magnetic stripe communications device 510, displays 520 and 540, RFID 560, IC chip 550, light sensor 590 and ink-receivable area 530. Persons skilled in the art will appreciate that information may be communicated from a card using sources of light, IC chips, RFIDs, and dynamic magnetic stripe devices to other devices such as readers, mobile phones, and other cards. Similarly, for example, light sensors, IC chips, RFIDs, and dynamic magnetic stripe devices may receive information from other devices such as, for example, readers, mobile phones, and other cards.

A GUI may be utilized to communicate light pulses to a card. Such a GUI may be displayed, for example, on a display of, for example, a laptop, stationary computer, television set, gaming device, or mobile telephonic device. For example, a user may select new products, or new characteristics of a product, on a mobile telephonic device. The mobile telephonic device may then communicate light pulses, via a GUI, to a card in order to add such new products onto the card. In this manner, for example, a user may modify the contents of a card and the capabilities of the card at any point in his/her day. Similarly, for example, the card may communicate data back to a mobile telephonic device (e.g., via light pulses picked up by a video camera on a mobile phone). Such data may include, for example, data indicative of the card's identity and other security data. In this manner, for example, a card may execute a security handshake with another device (e.g., a mobile telephonic device) in order to establish a secure communications connection. Persons skilled in the art will appreciate that any feature provided on a card may be provided on a mobile phone and configuration information may be communicated from the mobile phone to a card (e.g., via light or sound pulses) in order to perform an operation on the card (e.g., add, replace, or modify a product).

Figure 6:
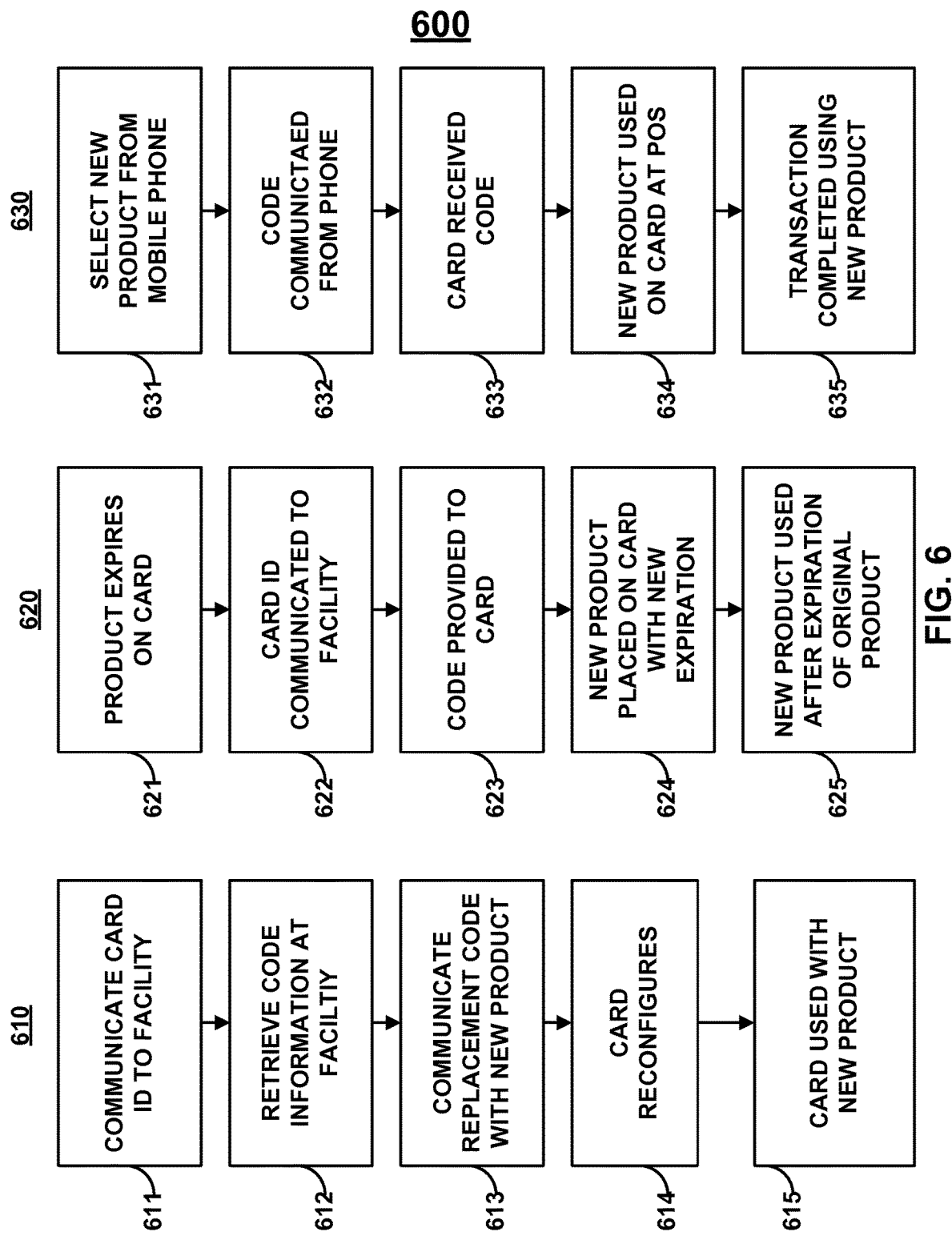
FIG. 6 is a flow chart of processes constructed in accordance with the principles of the present invention.

FIG. 6 shows flow charts 610, 620, and 630. Flow chart 610 may include step 611, in which card identification information is communicated to a facility. Step 612 may initiate, in which a code is retrieved at a facility. Step 613 may initiate, in which a replacement code is communicated with new product information. A card may reconfigure in step 614. The reconfigured card may be utilized with the new product in step 615.

Flow chart 620 may be utilized and may include step 621, in which a product expires on a card. Step 622 may be utilized to communicate card identification data to a facility. Step 623 may be included, in which a code is provided to the card. Step 624 may then occur in which a new product is placed on the card with a new expiration. Step 625 may occur in which the new product is utilized after the expiration of the original product.

Flow chart 630 may be utilized and may include step 631, in which a new product is selected from a mobile phone. A code may be communicated from the phone in step 632. A card may receive the code in step 633. Step 634 may occur, in which new product is used on card at a point-of-sale. Step 635 may occur in which a transaction may be completed utilizing the new product.

Figure 7:
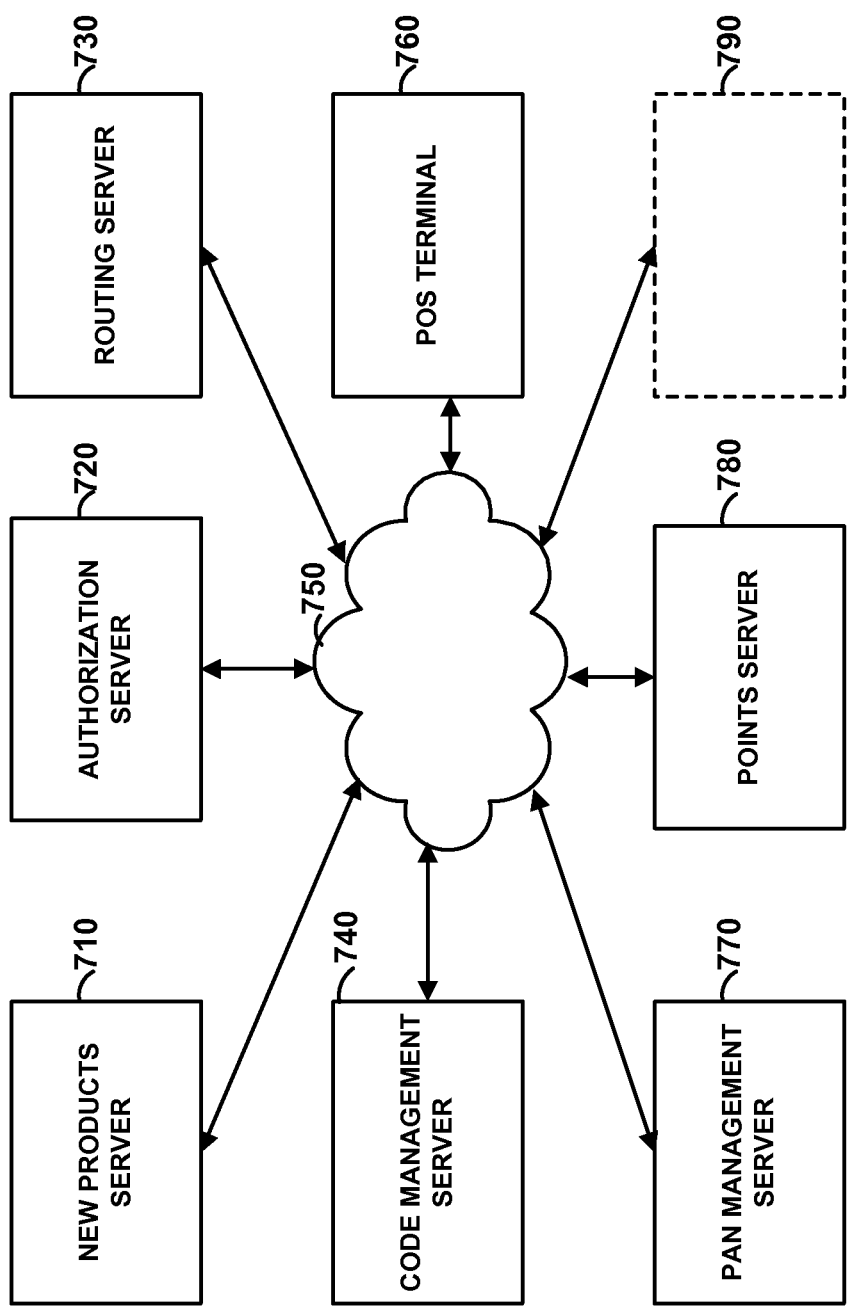
FIG. 7 is an illustration of a network topology constructed in accordance with the principles of the present invention.

FIG. 7 shows network topology 700 that may include communications network 750 to communicate data between new products server 710, authorization server 720, routing server 730, code management server 740, POS terminal 760, PAN management server 770, points server 780, and other devices 790. Other devices may include, for example, mobile telephonic devices. New product server 710 may provide a new product on a card. The new product may be activated via an activation server (e.g., via a code generated from, or provided to, code management server 740). Information to initiate a purchase may be generated on card and communicated to POS terminal 760 via a dynamic magnetic stripe communications device. POS terminal 760 may utilize routing server 730 to route the information to authorization server 720 for authorization. Persons skilled in the art will appreciate that new products server 710 may utilize PAN management server 770 to select a PAN for a particular product and update a profile associated with that PAN. Points associated with the product may be managed at points server 780. A card may receive information from, for example, light pulses from a GUI of a mobile telephonic phone.

Figure 8:
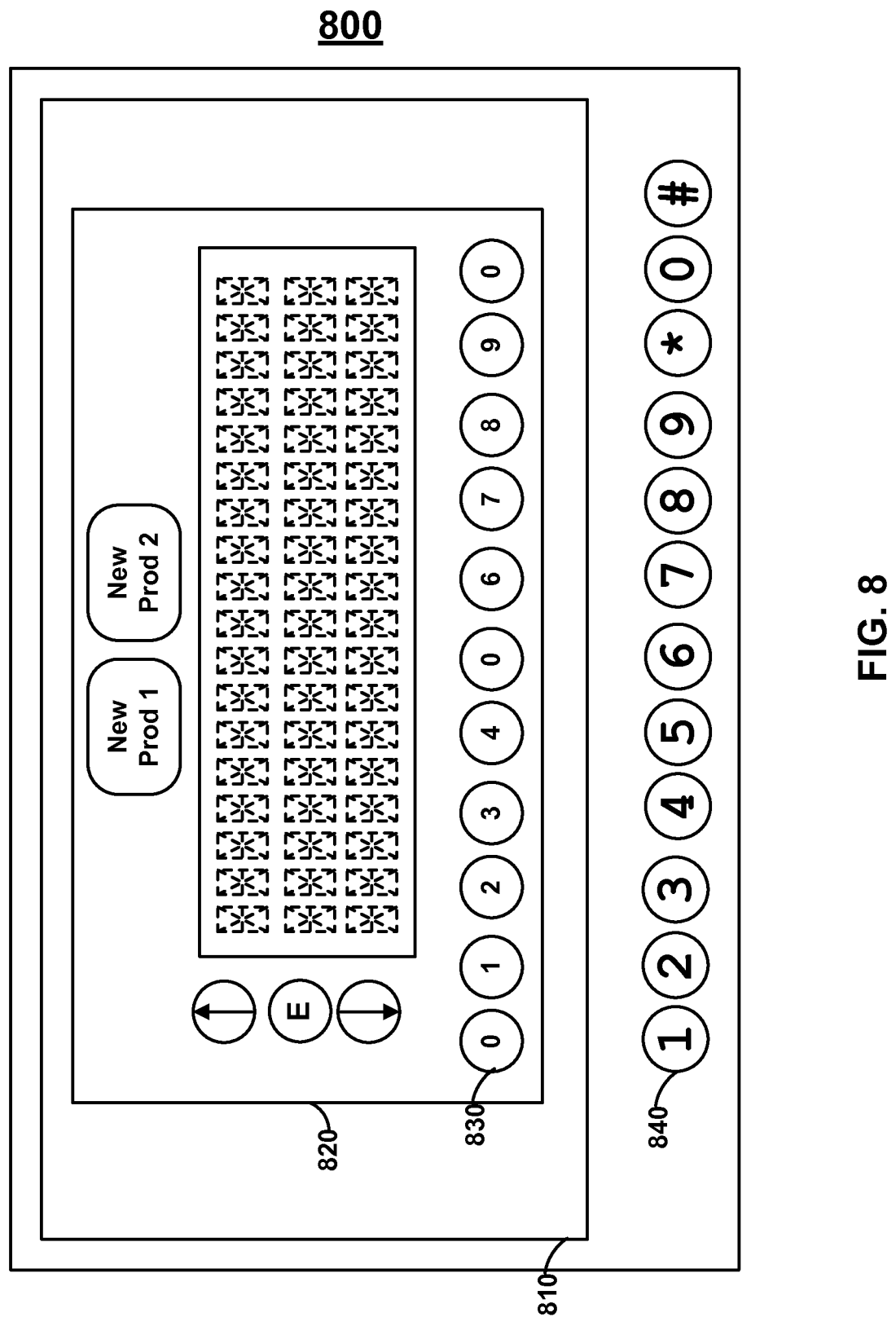
FIG. 8 is an illustration of a virtual card constructed in accordance with the principles of the present invention.

FIG. 8 shows mobile device 800 that may include display screen 810 and manual input interface 830. Mobile device 800 may be, for example, a mobile telephonic phone. Virtual card 820 may be displayed on display screen 810 and include virtual button 830 (e.g., display 810 may be a capacitive touch-screen). Any card discussed herein may be provided as a virtual card and utilized on a mobile device (e.g., a mobile telephonic device). Information may be communicated through, for example, communication devices of the mobile telephone (e.g., a wireless transmitter/receiver). A virtual wallet may be provided on device 800 that includes multiple virtual cards. Any physical card may be represented as a virtual card. Device 800 may include, for example, an RFID antenna operable to communicate with an RFID reader, a dynamic magnetic stripe communications device operable to communicate a magnetic stripe track wirelessly to a read-head of a magnetic stripe reader from a distance of approximately a quarter of an inch, or a pop-out piece of plastic that includes an exposed IC chip or contacts operable to communicate with an exposed IC chip card reader.

Persons skilled in the art will appreciate that a card number associated with a product may be compromised by a fraudulent person. Accordingly, a card issuing entity (e.g., a bank) may change the payment card number associated with the product in order to combat against fraud. In this manner, for example, a user may report a fraud using an application on his/her mobile phone. A GUI may be generated that emits light pulses such that a new card number may be stored on the card. The old number may be deactivated such that the number cannot be used in a payment transaction. Similarly, a remote facility may communicate a code to a user (e.g., online via a webpage or verbally over the phone) to enter into the card to replace a card number. Additionally, a card may store multiple payment card numbers for a particular product and a particular code may, for example, cycle to the next payment card number.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A device, comprising:
   a storage apparatus, an inactivated product stored on said apparatus,
   wherein said inactivated product is a product requiring activation by a user prior to completion of a transaction associated with said inactivated product.

2. The device of claim 1, further comprising:
   a communications device selected from a dynamic magnetic stripe communications device, an integrated circuit (IC) chip, a radio frequency identification device (RFID), and combinations thereof.

3. The device of claim 1, wherein said inactivated product is a plurality of inactivated products.

4. The device of claim 1, further comprising:
   a code stored in said storage apparatus,
   wherein said storage apparatus is a memory, and
   said code is associated with said inactivated product.

5. The device of claim 1, further comprising:
a code stored in said storage apparatus
wherein said storage apparatus is a memory,
said code is associated with said inactivated product, and
said code includes embedded information.

6. A method, comprising:
storing an inactivated product in a memory of a device,
wherein said inactivated product is a product requiring activation by a user prior to completion of a transaction associated with said inactivated product.

7. The method of claim 6, further comprising:
storing a code in said memory of said device,
wherein said code is associated with said inactivated product.

8. The method of claim 6, further comprising:
storing a code in said memory of said device,
wherein said code is associated with said inactivated product, and
wherein said code includes embedded information.

9. The method of claim 6, further comprising:
storing information associated with a payment product in said memory of said device.

10. The method of claim 6, further comprising:
storing information associated with a payment product in said memory of said device; and
communicating, via a server, at least a portion of said information to a remote facility.

11. The method of claim 6, further comprising:
storing information associated with a payment product in said memory of said device; and
receiving, via a server, replacement information; and
replacing at least a portion of said information with said replacement information.

12. The method of claim 6, further comprising:
receiving, via a server, replacement code; and
replacing at least a portion of a code associated with said inactivated product with said replacement code.

13. A method, comprising:
receiving, via a server, payment device identification information at a remote facility, wherein the payment device includes a memory and a first code stored in said memory;
retrieving at the remote facility a second code;
communicating, via a server, said second code and new product information to said payment device,
wherein said second code is operable to replace said first code in said memory of said payment device.

14. The method of claim 13, wherein the payment device comprises an inactivated product, and
said inactivated product is a new product requiring activation by a user prior to completion of a transaction associated with said inactivated product.

15. A method, comprising:
communicating, via a server, payment device identification information to a remote facility, wherein the payment device includes a memory and a first code stored in said memory;
receiving, via a server, a second code and new product information to said payment device;
replacing said first code with said second code in said memory of said payment device.

16. The method of claim 15, wherein the payment device comprises an inactivated product, and
said inactivated product is a new product requiring activation by a user prior to completion of a transaction associated with said inactivated product.

17. The device of claim 1, wherein said inactivated product is a payment product.

18. The device of claim 1, wherein said inactivated product is selected from a debit product, a credit product, a gift product, a pre-paid payment product, a loyalty product and combinations thereof.

* * * * *